United States Patent [19]

Frei et al.

[11] Patent Number: 4,623,515

[45] Date of Patent: Nov. 18, 1986

[54] PROCESS FOR PRODUCING FIBROUS AND GRANULAR MATERIALS FROM WASTE

[75] Inventors: Josef Frei, Oberehrendingen; Hans Schweri, Flesenau; Rudolf Schnorf, Uetikon am See, all of Switzerland

[73] Assignee: Organ-Fager Technology, N.V., Netherlands Antilles

[21] Appl. No.: 628,136

[22] Filed: Jul. 11, 1984

Related U.S. Application Data

[63] Continuation of Ser. No. 333,401, Dec. 22, 1981, abandoned.

[30] Foreign Application Priority Data

Dec. 24, 1980 [CH] Switzerland .......................... 9557/80
Dec. 7, 1981 [CH] Switzerland .......................... 7795/81

[51] Int. Cl.$^4$ .............................................. A61L 2/00
[52] U.S. Cl. ...................................... 422/1; 241/135;
 241/DIG. 38; 422/5; 422/26; 422/28; 422/32
[58] Field of Search ...................... 422/1, 5, 32, 28, 26;
 209/3, 11, 38, 39; 241/81, 135, DIG. 38

[56] References Cited

U.S. PATENT DOCUMENTS

| | | | |
|---|---|---|---|
| 3,003,708 | 10/1961 | Leonard | 241/81 |
| 3,547,577 | 12/1970 | Lovercheck | 422/34 X |
| 3,579,320 | 5/1971 | Pesses . | |
| 3,670,972 | 6/1972 | Quinn | 241/81 X |
| 3,721,183 | 3/1973 | Dunlea | 422/32 X |
| 3,802,631 | 4/1974 | Boyd . | |
| 3,844,491 | 10/1974 | Williams . | |
| 3,892,706 | 7/1975 | Jetzer . | |
| 3,905,556 | 9/1975 | Drage . | |
| 3,925,198 | 12/1975 | Eckhoff et al. | 209/3 |
| 3,951,731 | 4/1976 | Jetzer . | |
| 3,989,499 | 11/1976 | Jetzer . | |
| 4,036,441 | 7/1977 | Basten et al. | 241/DIG. 38 |
| 4,077,847 | 3/1978 | Choi et al. | 209/3 X |
| 4,116,822 | 9/1978 | Webb | 209/11 |
| 4,145,007 | 3/1979 | Jetzer . | |
| 4,227,653 | 10/1980 | Jetzer . | |
| 4,242,197 | 12/1980 | Voelskow et al. | 209/3 |

FOREIGN PATENT DOCUMENTS

| | | | |
|---|---|---|---|
| 0002122 | 5/1978 | European Pat. Off. | 209/3 |
| 0011592 | 5/1980 | European Pat. Off. | 209/3 |
| 2548322 | 5/1977 | Fed. Rep. of Germany | 209/3 |
| 2804353 | 8/1978 | Fed. Rep. of Germany | 209/3 |
| 2817304 | 10/1978 | Fed. Rep. of Germany | 209/3 |
| 1498767 | 1/1978 | United Kingdom | 209/3 |

Primary Examiner—Barry S. Richman
Assistant Examiner—Brion P. Heaney
Attorney, Agent, or Firm—Panitch Schwarze Jacobs & Nadel

[57] ABSTRACT

In order to avoid producing any secondary waste in the production of a fibrous and a granular material from household, agricultural, forestry waste, organic waste of the manufacturing and/or service industries, the primary waste first undergoes an opening treatment in an opening unit and then, after removal of any metallic components by magnetic separation units, is divided into three fractions. Such division is effected by a fractioning unit into (a) a fine fraction not exceeding the required final product particle size, (b) a coarse fraction easy to process mechanically, and (c) a coarse fraction difficult to process mechanically. The two coarse fractions are then separately reduced to the required final product particle size in reducing unit optimally suited to the particular coarse fraction. Then all three fractions are re-united and dried to a specific maximum residual moisture content and sterilized in a drying unit by heating and extraction of the resultant steam, and are jointly fractionated by a further fractionating unit and air separators into a heavy fraction consisting chiefly of inorganic granulate, a light fraction consisting chiefly of organic fibres, and a dust fraction consisting chiefly of organic dust particles.

17 Claims, 1 Drawing Figure

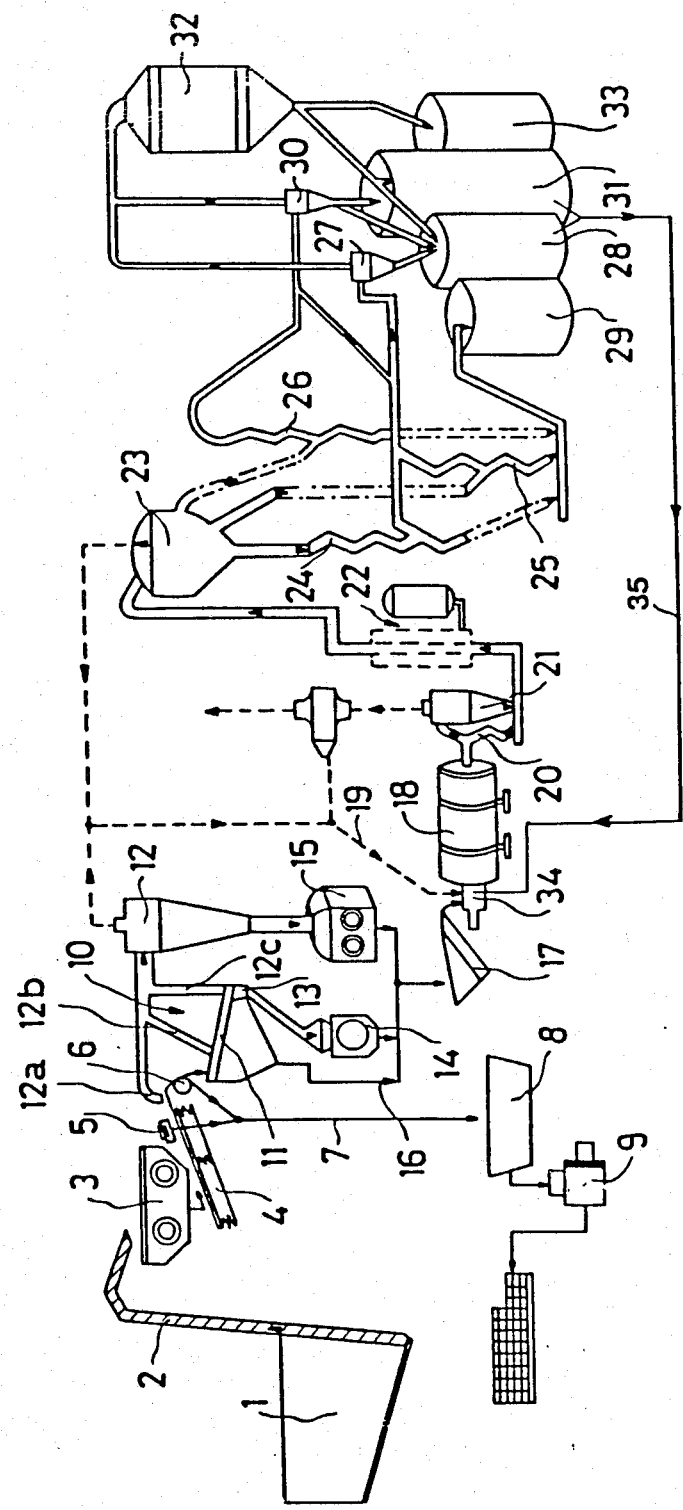

PROCESS FOR PRODUCING FIBROUS AND GRANULAR MATERIALS FROM WASTE

This application is a continuation of application Ser. No. 333,401, filed Dec. 22, 1981, now abandoned.

FIELD OF THE INVENTION

The present invention concerns a process for the production of a fibrous and a granular material from household, agricultural and forestry waste, organic waste of the manufacturing and/or service industries; a system for the performance of such process; a process for the operation of such system; and a use of the fibrous and the granular material produced by the said process.

BACKGROUND OF THE INVENTION

There are several known processes for the production of fibrous and/or granular material from household, agricultural and forestry waste, organic waste of the manufacturing and/or service industries, but they all have the disadvantage that in the course of processing about 30 weight-% of theoretically useful initial material is discarded as useless waste; this not only involves a loss of still useful material but also causes considerable cost for the disposal of such material discarded as waste.

SUMMARY OF THE INVENTION

The object of the present invention is to provide a process which does not involve the disadvantages mentioned, that is, which does not produce secondary waste.

The said object is achieved according to the present invention by a process in which the waste to be processed undergoes an opening treatment, the opened waste is divided into at least two fractions, viz. (a) into a fraction easy to reduce mechanically and (b) into a fraction difficult to reduce mechanically; next, these two fractions, separately from each other, are reduced to the required final product particle size, then both fractions are re-united and dried to a specific maximum residual moisture content by heating and extraction of the resultant steam, and sterilized, and both fractions, if applicable, after an intermediate treatment, are jointly divided again into at least two fractions by particle size. For this, it will be expedient if the opened waste is divided into at least three fractions, viz. (a) into a fine fraction not exceeding the required final product size, (b) into a coarse fraction easy to reduce mechanically, and (c) into coarse fraction difficult to reduce mechanically; next, if the two coarse fractions, separately from each other, are reduced to the required final product particle size, then if all three fractions are re-united and dried to a specific maximum residual moisture content by heating and extraction of the resultant steam, and sterilized, and all three re-united fractions, if applicable, after an intermediate treatment, are jointly divided again into at least two fractions by particle size.

Where the waste delivered contains magnetically removable metallic components, it will be expedient to remove such components after the opening of the waste to be processed and before the division thereof into several fractions.

Where a waste gas separator is used, it will be expedient, with a view to reducing the mechanical wear thereof by the material passing through, if immediately after drying and sterilization the material thus treated is divided into a light and a heavy fraction, and if the light fraction is passed to a waste gas separator for the purpose of removing the damp gas, in particular air, developed in the drying stage, and then the light fraction, after removal of the damp waste gas, is united with the heavy fraction, and the two fractions are jointly passed to the further fractionating stage.

It has been found advantageous to divide the dried and sterilized material into three fractions, one of which has a particle size of less than 3 mm$^2$ screen mesh, the second a particle size of 3 to 6 mm$^2$ screen mesh, and the third a particle size of over 6 mm$^2$ screen mesh.

For many applications of the material produced it will further be expedient if the material, dried and sterilized and preferably, if applicable, after previous fractionating into at least two different particle size ranges, is divided into at least two fractions by specific gravity. For this, it is advantageous to divide the material into at least three fractions by its specific gravity, viz. (a) into a light fraction consisting chiefly of organic fibres, (b) into a heavy fraction consisting chiefly of inorganic granulate, and (c) into a dust fraction consisting chiefly of dust particles.

With a view to eliminating any offensive smells and any undesirable bacteria still present, it is expedient to expose the dried and sterilized material to an ozone treatment.

It is another object of the present invention to provide a system for the performance of the process hereunder, characterized in that it comprises an opening unit for the opening of the material to be processed, a fractionating unit for separation into the fraction easy to reduce mechanically and the fraction difficult to reduce mechanically, a first reducing unit to reduce the fraction of low reducibility, a second reducing unit to reduce the easily reducible fraction, a drying unit to dry the re-united different fractions, and a further fractionating unit for the joint re-fractionating of the dried fractions by particle size.

For this, it will be expedient if the said system comprises a fractionating unit with at least one joggling or oscillating screen to obtain a fine fraction; a suction unit clearing the top of the joggling or oscillating screen to obtain the mechanically easily reducible, mainly light, coarse fraction; and a receiving arrangement to receive such material present on the joggling or oscillating screen as cannot, because of its size and/or weight, pass through the screen or be sucked away, to obtain the low-reducibility fraction; and a first reducing unit to reduce the low-reducibility coarse fraction, and a second reducing unit to reduce the easily reducible coarse fraction.

It will be expedient if the first reducing unit consists of granulating means, namely, a hammer, impact or beating mill. Also, it will be of advantage if the second reducing unit consists of a fine chopper, a cutter or a fine mill and presents at least one knife rotor.

It will further be expedient if a conveyor consisting of a conveyor belt or a vibrating chute is arranged between the opening unit and the fractionating unit, and if, for the removal of metallic components from the opened material being conveyed, (a) a magnetic band is arranged above the said material and immediately above the conveyor, and (b) a drum magnet is arranged below the said material at the end of the conveyor, over which drum magnet the material passes.

It is yet a further object of the present invention to provide a process for the operation of the system hereunder, characterized in that at least the drying unit is heated by means of the fibrous material produced.

Finally, it is yet a further object of the present invention to use the fibrous material produced hereunder for the production of pressings, such as pressed board, or bricks or pellets serving as heating fuel.

The invention is now to be illustrated by way of example with reference to the accompanying drawing.

DETAILED DESCRIPTION

As the drawing shows, the waste is tipped into a bunker 1. It is preferable to use waste which has undergone little or no fermentation and which has not been subjected to any treatment such as comminution, sorting, compaction on dumps or chemical treatment. The use of fresh organic waste has the advantage that the fibrous crude material can be given the structure desired, and that the important components such as cellulose and lignin have been neither removed nor destroyed.

The waste thus bunkered is passed continuously or discontinuously by a mechanical conveyor 2 to an opening unit 3. This unit serves to open the crude material, which is present in various forms, into its loose components, and also to reduce the widely varying waste by cutting, chopping and/or shredding to a size suitable for further processing. This function can be performed by cutting or beating mills and by choppers or shredders. To ensure trouble-free processing and to obtain the required structure, fineness and purity of the final product, it is preferable to use a slow-running cutting mill such as is commercially available in various versions. It is expedient to use a version having multi-knife shafts arranged side by side and running in opposition to each other. Also, the multi-knife shafts should generally run at low speeds, and the individual shafts should run at different speeds. Again, for dependability, performance and self-cleaning, all shafts should be reversible. Such a machine is commercially available by the designation "shredder". Such or similar machines are also used for the destruction of old cars and other sheet-metal products.

The material thus opened by the opening unit 3 and reduced to a size corresponding to a screen mesh of 20×30 cm drops on to a conveyor unit consisting of a vibrating chute 4.

To ensure trouble-free operation in the succeeding stages, it is important to remove completely any iron parts present in the waste. For this purpose, the conveyor unit 4 forwards the material in the form of an evenly aligned and relatively thin flow layer past a magnetic band 5 arranged above the conveyor unit 4 and delivers it at its end on to a rotating drum magnet 6 arranged below the conveyor unit. As the waste quantities leaving the opening unit vary, the conveyor unit 4 is provided at a point before the magnetic band 5 with an equalizing unit, not shown.

The magnetic band 5 serves to remove the iron parts present in the upper portion of the flow layer. The rotating drum magnet 6 serves to remove the iron parts present in the lower portion of the flow layer.

The magnetic units 5 and 6 are connected by a conveyor unit 7 to a bunker 8. From the bunker 8, the metal removed passes into a press 9 which presses the metal parts into commercially acceptable packets which may be passed on to a scrap metal foundry.

The material thus cleared of iron parts passes to a fractionating unit 10. The latter comprises a joggling screen 11 of about 6 mm mesh to obtain a fine fraction. It further comprises a suction unit clearing the top of the joggling screen 11 to obtain a mechanically easily reducible coarse fraction, and is provided at the lower end of the inclined joggling screen 11 with a chute 13 to receive such material still present on the joggling screen 11 as cannot, because of its size and/or weight, pass through the screen or be sucked away therefrom, for the purpose of obtaining a low-reducibility, mainly heavy, coarse fraction.

This separation into three fractions has the advantage that the succeeding reducing units 14 and 15 are relieved of the fine parts which do not exceed the required final size. The quota of such fines is normally about 15 weight-%, which means that in the succeeding reducing stages about 15% of energy is saved. The fines thus removed are passed through a duct 16 bypassing the two reducing units 14 and 15 and are then admixed to the waste reduced in the latter two units.

The separation into the two coarse fractions has the advantage that the two very different waste components are separated and can therefore be reduced to the required final size by reducing units best suited to each, and can in addition be given the required material structure, so that in the last stage of the process, in which the material is sorted first by size and then into mainly specifically light fibrous and mainly specifically heavy granular fractions, a very high separation accuracy and purity is achieved for the individual fractions.

The suction unit 12 may be a commercially available unit such as is used in the chipboard and cattle feed industries. The light coarse material which the suction unit 12 sucks from the waste flow through the suction ducts 12a, 12b and 12c consists chiefly of paper, cardboard, foil, textiles and wood chips, that is, organic materials, and is passed for final structuring and reduction to a reducing unit of the fine chopper type. Such reducing units are commercially available under such designations as fine choppers, cutters or fine mills. It has been found expedient to use rotor-type reducing units in which knife rotors work against knife stators, or knife rotors against knife rotors, and which present a barrier-type selector to obtain the required final material size.

The mainly heavy coarse fraction, which has been cleared of fines and of specifically light components by the joggling screen 11 and the suction unit 12 and which is of low reducibility and in practice consists largely of inorganic matter, now undergoes a reducing process in the separate reducing unit 14. This unit serves to reduce the different waste components to the required final size of 6 mm screen mesh suitable for complete recycling. Such reducing units 14 are commercially available by the designations of hammer, impact or beating mills, and can be used if provided with a barrier-type selector set to the smallest screen mesh.

The fractions from the reducing units 14 and 15 and from the bypass duct 16 pass jointly into a bin 17. The material stored in the latter then passes to a drying and sterilizing unit 18. This unit serves to dry the material to a specific constant residual moisture and to destroy nocuous substances present in the material, such as pathogenic bacteria. For the purpose, temperatures of over 100° C. are attainable in the drying unit 18, and the residence time of the material in the unit is also controllable. The supply of hot dry air from the heater 34 and through the recirculation duct 19, and the discharge of the moisture-loaded air, proceed continuously and are also controllable, for the purpose of controlling to a target value the residual moisture of the material leaving the drying unit 18.

After the drying unit 18, the material is separated by a separating unit 20 into a light and a heavy fraction, and the light fraction then passes to a waste air separator 21 of cyclone type for the discharge of the damp waste air from the drying process. By this arrangement it is possible considerably to reduce the wear in the waste air separator 21 and at the same time considerably increase the dependability thereof. The material leaving the separator 21 is then re-united with the previously separated heavy fraction, and passes through an ozone treatment unit 22 to a fractionating unit 23. The latter serves to separate the dried and sterilized material by particle size into three fractions, one of which has a particle size of less than 3 mm$^2$, the second a particle size of between 3 and 6 mm$^2$, and the third a particle size of over 6 mm$^2$. The fractionating unit 23 may have oscillating or vibrating working surfaces. It is preferable to use a lighweight version having a vibrating working surface. Amplitude and vibration rate should be variable to permit intensity and residence time of the treatment to be regulated.

The three size fractions delivered by the fractionating unit 23, each composed of organic (mainly light) and inorganic (mainly heavy) particles, pass by separate paths to the final fractionating stage. Final fractionating is performed by the air separators 24, 25 and 26, which serve to separate the mixed materials such as minerals, nonferrous metals, hard plastics, etc., from the organic substances. Such air separators are commercially available in various versions and are also used in the food, cattle feed and wood industries.

The fine fraction delivered by the fractionating unit 23 is forwarded pneumatically for final fractionating to the air separator 24, where the material is fed at a certain point into an opposed air flow. The rate of the air flow is such that the mainly organic light fibrous particles are entrained by the air flow, while the mainly inorganic specifically heavy particles drop down against the air flow.

The light particles thus entrained pass to a cyclone 27 which is arranged directly as a silo feed unit on the raw fibrous material silo 28.

The specifically heavy particles dropping down against the air flow are passed to the granulate silo 29.

The intermediate fraction delivered by the fractionating unit 23 passes for final fractionating to the air separator 25. The light particles separated there may be passed to either of the separators 27 and 30 of the silos 28 and 31. The mainly inorganic heavy granulates separated by the air separator 25 pass to the granulate silo 29 mentioned.

The coarse fraction leaving the fractionating unit 23 passes for final fractionating to the air separator 26, which works in the same manner as the two other air separators 24 and 25. The light particles separated by the air separator 26 are likewise delivered to either of the raw fibrous material silos 28 and 31. The mainly inorganic heavy granulate separated by the air separator 26 passes, mixed with the granulate from the air separators 24 and 25, into the granulate silo 29.

The dust-loaded waste air from the air separators 24, 25 and 26 and from the separators 27 and 30 passes to a filter unit 32. The dust separated in the latter, consisting chiefly of organic fines, can be passed to the dust silo 33 or to the silos 28 and/or 31, as preferred.

The storage of the final products, viz. one granular fraction, two fibrous fractions and one dust fraction, in separate silos facilitates and extends the possibilities of re-use.

Of course, the mainly inorganic heavy granulates from the air separators 24, 25 and 26 may instead be stored as separate lots.

The fibrous material thus obtained may, for example, be processed further for the production of board or other building materials or converted into heating fuel in the form of bricks or pellets. The granular material obtained can also be used as fertilizer and soil improver and as aggregate for asbestos, cement and brick products and for artificial stone, bituminous pavings and concrete.

As may be seen from the embodiment described, the entire waste delivered, including the magnetically removed metal, is recycled in this process. The quota of non-combustible substances in the specifically light fibrous fraction in this process is equally high or lower than in the comparable wood chip fractions which are still normally used in pressed board production.

The heater 34 of the drying unit 18 is preferably fired with material taken from the raw fibrous material silos 28 and/or 31 via line 35.

What we claim is:

1. A process for producing a fibrous material and a granular material from solid household, agricultural, forestry, or industrial waste, said waste containing both inorganic and organic portions, comprising treating substantially the entirety of the waste by the steps of:
    (a) dividing the waste into at least three first fractions including a fine fraction of particles which are smaller than a required final particle size, a mainly light coarse fraction of particles that are easy to reduce in size mechanically, and a mainly heavy coarse fraction of particles that are difficult to reduce in size mechanically;
    (b) separately reducing the particle size of said coarse fractions to said required final particle size;
    (c) re-uniting all said first fractions;
    (d) drying the re-united first fractions to a predetermined maximum residual moisture content and sterilizing said re-united first fractions;
    (e) dividing the re-united, dried, sterilized first fractions into at least two final fractions, said at least two final fractions including a fibrous fraction and a granular fraction.

2. The process of claim 1, wherein the re-united, dried, sterilized first fractions are divided into three second fractions by particle size prior to step (e), the smallest second fraction having a particle size of less than 3 mm$^2$, the intermediate second fraction having a particle size of from about 3 mm$^2$ to about 6 mm$^2$, and the largest second fraction having a particle size over 6 mm$^2$ said second fractions are then each divided into said at least two final fractions in step (e).

3. The process of claim 1, wherein the coarse fraction easy to reduce in step (b) mechanically is reducing by cutting and the coarse fraction difficult to reduce in step (b) mechanically is reduced by granulating.

4. The process of claim 1, wherein the waste further includes magnetic components, and wherein the magnetic components are removed prior to dividing the waste in step (a).

5. A process for producing a fibrous material and a granular material from substantially solid household, agricultural, forestry or industrial waste, said waste containing both inorganic and organic portions, comprising the steps of:

(a) mechanically prereducing the particle size of the waste to be processed;

(b) treating substantially the entirety of the prereduced waste by dividing the prereduced waste into at least two first fractions by specific gravity, said at least two first fractions including a first light fraction and a first heavy fraction;

(c) separately mechanically reducing the particle size of said first light fraction and said first heavy fraction;

(d) re-uniting all of said first fractions of step (b);

(e) drying the re-united first fractions to a predetermined maximum residual moisture content and sterilizing said re-united first fractions;

(f) dividing the sterilized re-united first fractions into at least two final fractions, said at least two final fractions including a light fibrous fraction consisting essentially of organic fibers and a heavy granular fraction consisting essentially of inorganic granulate.

6. The process of claim 5, wherein the prereducing step (a) prereduces the waste to a size approximately corresponding to a screen mesh of 20×30 cm.

7. The process of claim 5, wherein the dividing step (b) additionally includes dividing the prereduced waste into a third first fraction, said third first fraction being a first fine fraction consisting of particles which are smaller than a required final particle size and do not need to be reduced in step (c).

8. The process of claim 5, wherein the first light fraction is reduced in step (c) by cutting and the first heavy fraction is reduced in step (c) by granulating.

9. The process of claim 5, wherein the first light fraction and first heavy fraction are reduced in step (c) to a size of about 6 mm screen mesh.

10. The process of claim 5, wherein the waste further includes magnetic components, and wherein the magnetic components are removed following the prereducing step (a) and before the dividing step (b).

11. The process of claim 5, wherein immediately after the drying and sterilizing step (e) and prior to step (f) the sterilized re-united first fractions are divided into an intermediate light and an intermediate heavy fraction; the intermediate light fraction is passed to a waste gas separator for discharge of damp gas resulting from the drying stage; and after discharge of damp waste gas the intermediate light fraction is re-united with the intermediate heavy fraction and both re-united intermediate fractions are divided into said at least two final fractions in step (f) by specific gravity.

12. The process of claim 11, wherein the re-united intermediate fractions are divided into at least two additional fractions of different particle size ranges and then the additional fractions are divided into said at least the two final fractions in step (f) by specific gravity.

13. The process of claim 5, wherein the re-united first fractions are dried and sterilized simultaneously in step (c) by exposing the re-united first fractions to heat at a temperature and for a time sufficient to reduce the residual moisture content to a predetermined maximum value and to destroy nocuous substances in the re-united first fration.

14. The process of claim 5, wherein the dried re-united first fractions of step (e) are sterilized by an ozone treatment step sufficiently to destroy nocuous substances therein.

15. The process of claim 5, wherein the sterilized re-united first fractions are divided into at least two intermediate fractions of different particle size ranges prior to step (f), and each of said at least two intermediate fractions is divided separately into said at least two final fractions in step (f) by specific gravity.

16. The process of claim 15, wherein the sterilized re-united first fractions are divided into three intermediate fractions prior to step (f), said three intermediate fractions comprising a first intermediate fraction having a particle size of less than 3 $mm^2$, a second intermediate fraction having a particle size of from about 3 $mm^2$ to about 6 $mm^2$, and a third intermediate fraction having a particle size over 6 $mm^2$, said intermediate fractions are then each divided into said at least two final fractions in step (f).

17. The process of claim 15, wherein the dividing step (f) additionally includes a third final fraction, said third final fraction being a dust fraction consisting essentially of dust particles, said light fibrous fraction consisting essentially of organic fibers, and said heavy granular fraction consisting essentially of inorganic granulate.

* * * * *